(12) United States Patent
Bender

(10) Patent No.: US 8,054,561 B2
(45) Date of Patent: *Nov. 8, 2011

(54) OPTICAL SYSTEM FOR MERGING A FIRST AND A SECOND PARTIAL IMAGE BEAM, EACH PROCEEDING FROM A SPECIMEN, INTO A RESULTANT IMAGE BEAM

(75) Inventor: Claus Bender, Asslar-Werdorf (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 81 days.

This patent is subject to a terminal disclaimer.

(21) Appl. No.: 12/552,229

(22) Filed: Sep. 1, 2009

(65) Prior Publication Data
US 2010/0053718 A1 Mar. 4, 2010

(30) Foreign Application Priority Data
Sep. 4, 2008 (DE) .................. 10 2008 041 822

(51) Int. Cl.
G02B 9/00 (2006.01)
G02B 9/08 (2006.01)
G02B 21/02 (2006.01)
G02B 21/18 (2006.01)

(52) U.S. Cl. .................. 359/740; 359/656; 359/372

(58) Field of Classification Search .................. 359/740, 359/738, 739, 656–661, 234, 368, 372
See application file for complete search history.

(56) References Cited

U.S. PATENT DOCUMENTS
2010/0053719 A1 * 3/2010 Muller-Rentz ................ 359/234

FOREIGN PATENT DOCUMENTS
| DE | 680950 | 8/1939 |
|---|---|---|
| DE | 938271 | 8/1955 |
| DE | 1037171 | 8/1958 |
| DE | 1623228 | 1/1971 |
| EP | 1416308 | 5/2004 |

* cited by examiner

Primary Examiner — Alicia M Harrington
(74) Attorney, Agent, or Firm — Schlee IP International P.C.; Alexander R. Schlee

(57) ABSTRACT

An optical system is described for merging a first and a second partial image beam emanating from a specimen into a resultant image beam allowing modification of the areal proportion of the respective first or second partial image beam in the resultant image beam. A stop arrangement comprises at least a first and a second movable stop element each comprising at least one stop region adapted to be brought into a working position with the first or second partial image beam. Movably arranged connecting means for connecting the two stop elements are provided to modify the respective areal proportions of the partial image beams in the resultant image beam by movement of the connecting means.

23 Claims, 14 Drawing Sheets

# OPTICAL SYSTEM FOR MERGING A FIRST AND A SECOND PARTIAL IMAGE BEAM, EACH PROCEEDING FROM A SPECIMEN, INTO A RESULTANT IMAGE BEAM

CROSS-REFERENCE TO RELATED APPLICATION

This application claims the priority of the German patent application DE 102008041822.6 having a filing date of Sep. 4, 2008. The entire content of this prior German patent application DE 102008041822.6 is herewith incorporated by reference.

BACKGROUND OF THE INVENTION

The present invention relates to an optical system for merging a first and a second partial image beam, each proceeding from a specimen, into a resultant image beam. Such systems are used in particular in optical instruments for the examination of multiple prepared specimens such as, for example, comparison microscopes or comparison macroscopes.

When comparative examinations are carried out, the image of a first sample is usually compared with the image of a second sample. Comparison microscopes and comparison macroscopes in which partial image beams deriving from two objectives can be combined, by means of an optical system such as, for example, a comparison bridge, into one resultant image beam that can be viewed by the user, are known for carrying out such examinations. A variety of possibilities for depiction usually exist in this context, the resultant image being generated from the partial images by corresponding setting of stops; a mixing or superimposition of the respective partial images, or partial side-by-side placement or juxtaposition of portions of the partial images, is possible in this context.

An optical system of the generic kind is described in DE 1 623 228 A. The comparison bridge that is described comprises two movable stop arrangements in order to generate the image configurations described above. For this purpose, the user must operate with both hands, during the examination, rotary knobs located approximately at shoulder height; this proves to be uncomfortable and difficult to handle. In particular, the use of both hands during operation is necessary, so that no other activities can be performed simultaneously.

Other embodiments of comparison bridges that can be operated with one hand are known, for example from DE 938271 A. These comparison bridges have the disadvantage, however, that the various image configurations described above cannot be displayed. In particular, variable juxtaposition of subregions of an image, and displacement of the separating line, are not possible.

In order to improve the mechanical comparison bridges just described, motorized configurations have been developed that offer convenient usability for a plurality of different image configurations. These motorized embodiments have, however, the disadvantage of considerable additional design complexity and therefore also of increased acquisition and maintenance costs.

SUMMARY OF THE INVENTION

It is therefore desirable to provide an optical system that, with little design complexity and without motorization, can be operated by the user as easily and conveniently as possible and nevertheless enables a variety of image configurations.

The invention provides an optical system for merging a first and a second partial image beam into a resultant image beam in an optical instrument for the examination of prepared specimens, wherein the first and second partial image beam both emanate from the specimen, said optical system comprising a stop arrangement provided with: at least one first movable stop element for the first partial image beam; at least one second movable stop element for the first partial image beam; wherein said first and second stop elements each comprise at least one stop region adapted to be brought into a working position with the first or second partial image beam by movement of the respective first or second stop element in order to modify the areal proportion of the respective first or second partial image beam in the resultant image beam; and a movably arranged connecting means for connecting the two stop elements, said connecting means being adapted to modify the respective areal proportions of the partial image beams in the resultant image beam by movement of the connecting means.

An optical system according to the present invention for merging a first and a second partial image beam, each proceeding from a specimen, into a resultant image beam can be utilized in particular in an optical instrument for the (for example, forensic) examination of prepared specimens, for example a comparison microscope or a comparison macroscope. The optical system comprises a stop arrangement that comprises, for the first and for the second partial image beam, a respective movable stop element each having one or more stop regions. In this context, at least one stop region can be brought, by movement of the stop element, into a working position with a partial image beam in order to modify the areal proportion of the respective partial image beam in the resultant image beam. The stop arrangement comprises a movably arranged connecting means for connecting the two stop elements. The respective areal proportions of the partial image beams in the resultant image beam are modifiable or settable by movement of the connecting means. A stop element is movable preferably within an image plane, for example an intermediate image plane, or into an image plane.

Advantages of the Invention

The solution according to the present invention offers the advantage that it is possible to make available an optical system of the generic kind that, with little design complexity, can be easily and conveniently operated by the user and enables multiple different image configurations. In the context of a comparative view of juxtaposed image segments of different specimens, the proportions of the individual partial images in the overall image can be modified by a movement, performable easily and also especially with one hand, of the mechanical connecting means. In this context the interface of the two partial images, for example a more or less distinct separation line or an overlap region, can be displaced within the image field, easily and especially with one hand, by the user. An overlap is also referred to hereinafter as a mixture or superimposition, the term "superimposition" not to be understood as interference. An easily operable and, in particular, unmotorized system that has a definite cost advantage with respect to motorized systems, but can be operated in similarly convenient fashion, can be provided.

Advantageously, the connecting means connects the two stop elements rigidly.

The stop arrangement can preferably be brought into a first position of the stop elements in which a first movement of the connecting means increases the areal proportion of the first partial image beam in the resultant image beam and decreases the areal proportion of the second partial image beam in the resultant image beam. Conversely, the first movement of the connecting means can also decrease the areal proportion of the first partial image beam in the resultant image beam and increase the areal proportion of the second partial image beam in the resultant image beam. This first position is used in particular for the so-called split image method, in which the resultant image is formed by juxtaposed, in particular complementary, image segments. Preferably provided for this purpose on both stop elements are stop regions that act as half-stops and can be brought into a working position with the respective partial image beam, and each block out a portion of the associated partial image beam. It is thus easy, by moving only the connecting means, to displace a separating line between the image segments in the resultant image (split image). It is moreover also possible for the separating line not to be visible in the region where the two partial images butt against each other, but instead for the two partial images to adjoin one another directly without a visible separating line. A partial overlap is provided as a further possibility. A first manually operable adjusting means is preferably provided in order to bring about the first movement of the connecting means.

The stop arrangement advantageously comprises at least one aligning means for aligning the stop elements with respect to one another, or the relative orientation of stop regions of different stop elements with respect to one another. Provision can be made, in particular, for orienting the stop regions in the first position of the stop elements so as thereby to modify the delimitation of the half-images in the resultant image. It is advantageous if the at least one aligning means is accessible for operation by the user or customer, so as thereby to avoid service calls. Alignments of optical systems are usually carried out by trained technicians if the user desires a modified image configuration. It is a matter of course to provide accessibility from outside.

According to a preferred embodiment of the invention, the stop arrangement comprises at least one first aligning means for displacing edges of the stop regions of different stop elements relative to one another. This preferably refers to edges that are located in the operator's field of view in the first position of the stop elements, and that delimit the respective half-images. By displacing the edges relative to one another it is possible to modify, in particular, a separating line between the half-images that is present in the first position (split image), so that a visible separating line between the half-images, direct adjacency of the half-images with no visible interruption, or even an overlap of the half-images, can be made available. The first aligning means is usefully accessible and mounted on the optical system so that it is operable by the user.

In equally advantageous fashion, the stop arrangement comprises at least one second aligning means for tilting or rotating edges of stop regions of different stop elements relative to one another. This second aligning means is, once again, usefully provided so as to be operated by the user during normal utilization of the optical system. The second aligning means enables, in particular, a parallel orientation of the edges of the stop regions. The preferred solution allows a user to carry out an alignment of the half-images with no need to request a technician or service person.

Especially when the optical system is used for forensic examinations, it may be helpful or necessary to modify the width of the separating line or the relative locations of the half-images; this can be achieved in simple fashion by way of the first and/or second aligning means operable by the user.

It is a matter of course to provide the at least one first and the at least one second aligning means on the same stop element. A relative orientation of stop regions of different stop elements can thus be achieved without configuring both stop elements in alignable fashion, thereby simplifying the design.

The movement of the connecting means is advantageously a rotary movement about a first rotation axis. A rotary movement is a movement that can be made available in physically simple fashion. In this case in particular, the connecting means can be embodied as an elongated piece, a strip, or a plate. The first axis advantageously extends perpendicular to a longitudinal axis of the connecting means, preferably between the stop elements.

It is advantageous if an eccentric arrangement or cam arrangement is provided in order to rotate the connecting means about the rotation axis. An eccentric arrangement or cam arrangement is particularly easy to operate manually, and can be arranged almost arbitrarily along the connecting means in order to convey a rotary movement. It is also a good choice to provide a tensioning means such as, for example, a spring, in order to obtain a rotary bearing with zero-clearance preload.

In equally advantageous fashion, the movement of the connecting means is a linear movement. A linear movement is also a movement that can be made available in physically simple fashion. In this case in particular, the connecting means can be embodied as an elongated piece, a strip, or a plate, or also as a bar, flexible shaft, or the like. The linear movement can extend, in particular, parallel or perpendicular to the partial image beams. Deflection means such as, for example, an inclined plane can be provided in order to arrange different stop regions in the beam paths in reaction to the linear movement of the connecting means.

According to a further embodiment, the movement of the connecting means is a circular movement or an elliptical movement, which likewise can be made available in physically simple fashion. The connecting means can once again be embodied as an elongated piece, a strip, or a plate, or also as a bar, flexible shaft, or the like. The circular movement can be transferred, in particular, to one or more helical bearings in order to arrange stop regions in the beam paths. This embodiment provides particular advantages because a stop setting that is brought about proves to be particularly robust with regard to external disturbances, and also can be maintained unchanged over a longer period of time.

According to a preferred embodiment, the stop arrangement can be brought into a second position of the stop elements in which the resultant image beam is formed by (in particular complete) mixing or superimposition of the two partial image beams. It is thus possible to make available an observation configuration in which the user can view both specimens in entirely or partly superimposed fashion, which is particularly suitable for specific examination methods. This configuration is referred to as a "mixed image."

It is likewise useful if the stop arrangement can be brought into a third and a fourth position of the stop elements in which the resultant image beam is formed only by the first or only by the second partial image beam, respectively. These image configurations, too, are particularly suitable for certain specimen examinations.

The influence of the adjustment of the aligning means on the resultant image beam in the second, third, or fourth position of the stop elements depends on the arrangement and size of the stop regions and on the area of the image in the intermediate image plane, and is thus definable by the relevant skilled person in the context of design. Be it noted that usually no influence is desired; this can easily be achieved by way of sufficiently large stop regions.

According to a particularly preferred embodiment, the stop arrangement can preferably be brought, by way of a respective movement of the two stop elements, into the first, second, third, or fourth position of the stop elements. Provision is made in particular that in addition to the movement of the two stop elements that is coupled by the connecting means, a separate movement of each individual stop element can also be carried out by the user or operator. For this purpose at least one stop element can, for example, be mounted rotatably or displaceably in order to introduce the at least one stop region to different degrees into the relevant partial image beam and thereby, in particular, allow the partial image beam to pass through completely or only partly, or to block it out completely. Usefully, a second and a third manually operable adjusting means are provided for moving each stop element.

It is a matter of course to mount at least one stop element rotatably on the connecting means, with the result that the movement of the stop element can be carried out easily by the operator. A rotary knob can be provided, for example, in order to rotate the stop element. Rotatable mounting is achieved, in particular, when the rotation axis of the stop lies on the connecting means.

Preferably, at least one stop element is mounted displaceably on the connecting means; this likewise represents a movement that can be performed particularly easily by the operator.

According to a likewise preferred embodiment, the one or more stop regions of at least one stop element form a continuous, cutout-free or orifice-free surface. Continuous stop regions can be manufactured more easily than orifice plates that are usual in the art.

A comparison microscope or comparison macroscope according to the present invention encompasses an optical system according to the present invention.

Further advantages and embodiments of the invention are evident from the description and the attached drawings.

It is understood that the features recited above and those yet to be explained below can be used not only in the respective combination indicated, but also in other combinations or in isolation, without leaving the context of the present invention.

The invention is depicted schematically, on the basis of exemplifying embodiments, in the drawings, and will be described in detail below with reference to the drawings.

DETAILED DESCRIPTION OF THE DRAWINGS

FIGS. 1 to 10, which are described below comprehensively, are various schematic views of a preferred embodiment of the optical system according to the present invention. In the Figures, like elements are referenced by like numerals.

Figure 1:
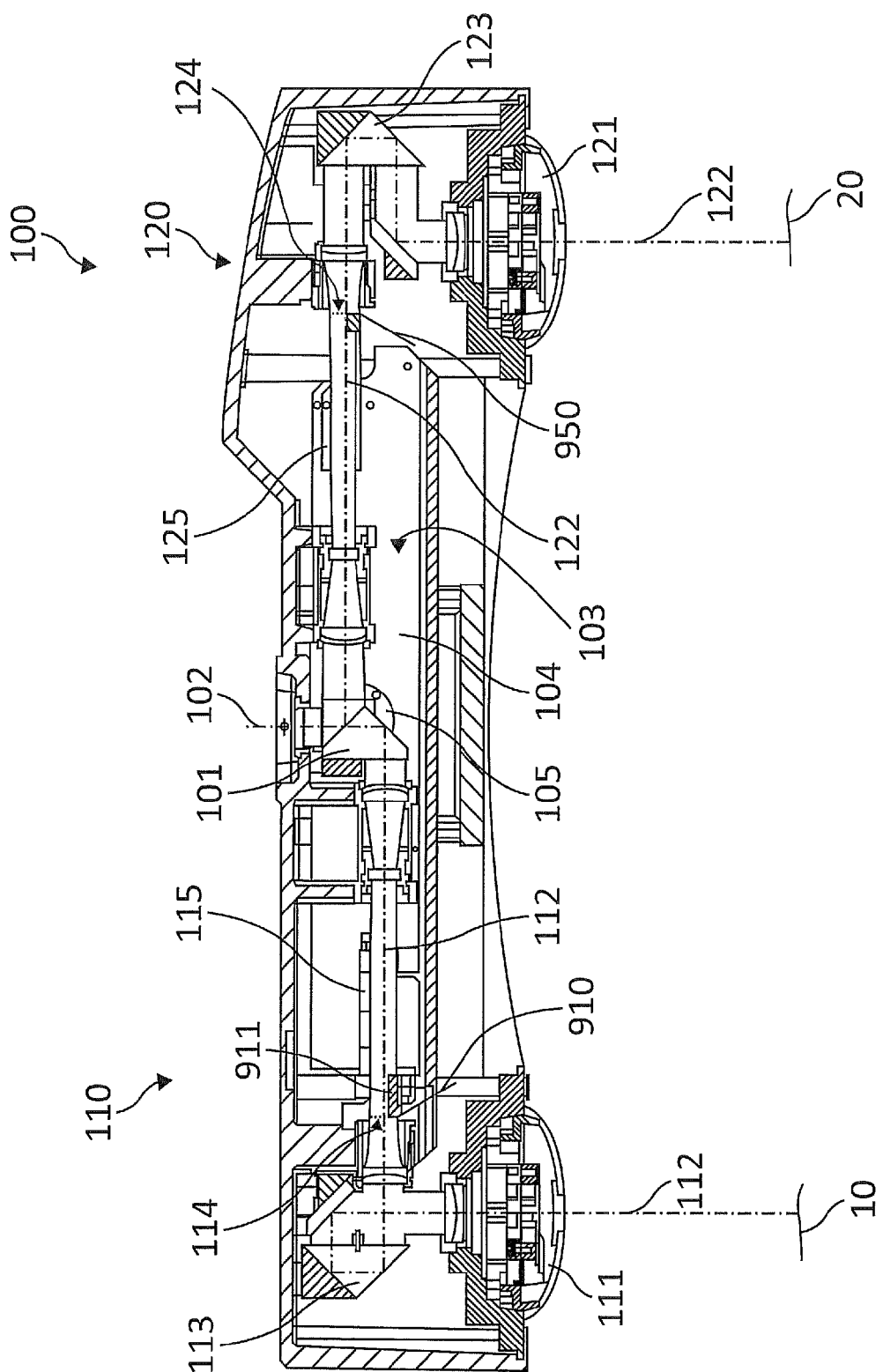
FIG. 1 is a side view schematically showing a preferred embodiment of the optical system according to the present invention.

In FIG. 1, the preferred embodiment of the optical system according to the present invention is schematically depicted in a sectioned view and referenced by 100 in its entirety. The optical system is embodied as comparison bridge 100 and serves for the observation of two specimens 10, 20 by merging partial image beams 112, 122 (indicated in part only by way of the optical axis), respectively proceeding therefrom, into one resultant image beam 102.

Comparison bridge 100 comprises a left arm 110 as well as a right arm 120, each comprising a respective objective receptacle 111, 121. Optical system 100 can be equipped, by means of receptacles 111 and 121, with microscope or macroscope objectives or objective turrets in order to couple the respective partial image beam 112, 122 into comparison bridge 100. The two partial image beams 112 and 122 are merged, in an optical mixing member embodied here as splitter prism 101, into resultant image beam 102, which leaves comparison bridge 100 at the top and is coupled, for example, into an attachable optical tube (not shown). An optical tube can be provided in known fashion in order to couple the resultant image beam alternatively or simultaneously into eyepieces, cameras, etc.

Within comparison bridge 100, left partial image beam 112 is deflected via a deflection element embodied here as mirror 113. Right partial image beam 122 is likewise deflected via a deflection element embodied here as mirror 123, so that the two partial image beams arrive at prism 101 horizontally and in parallel offset fashion.

Figure 2:
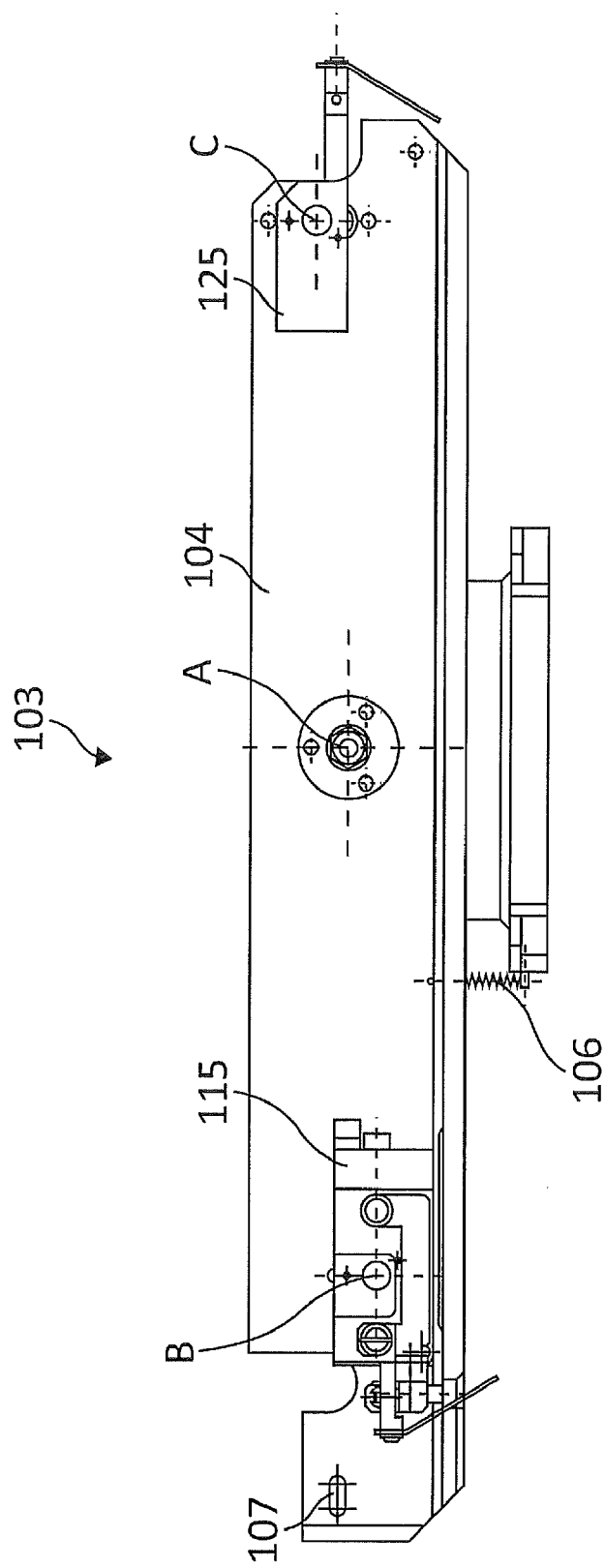
FIG. 2 shows the stop arrangement of FIG. 1 in a horizontal position.
Figure 3:
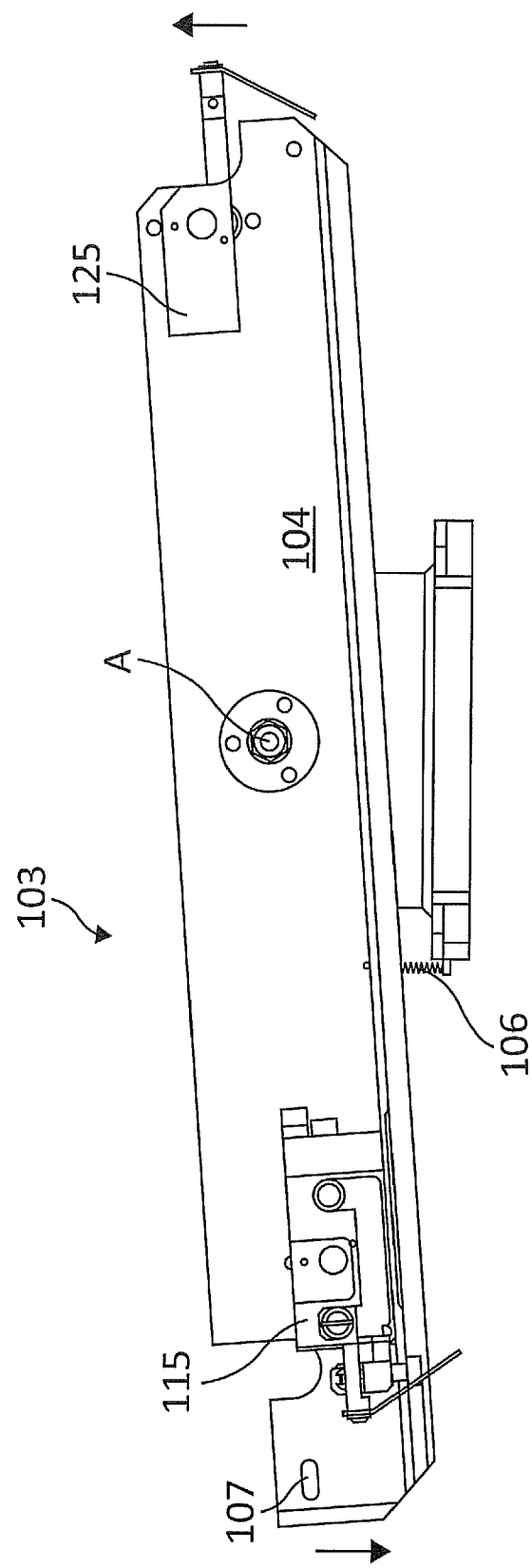
FIG. 3 shows the stop arrangement of FIG. 1 in a position tilted to the left.
Figure 4:
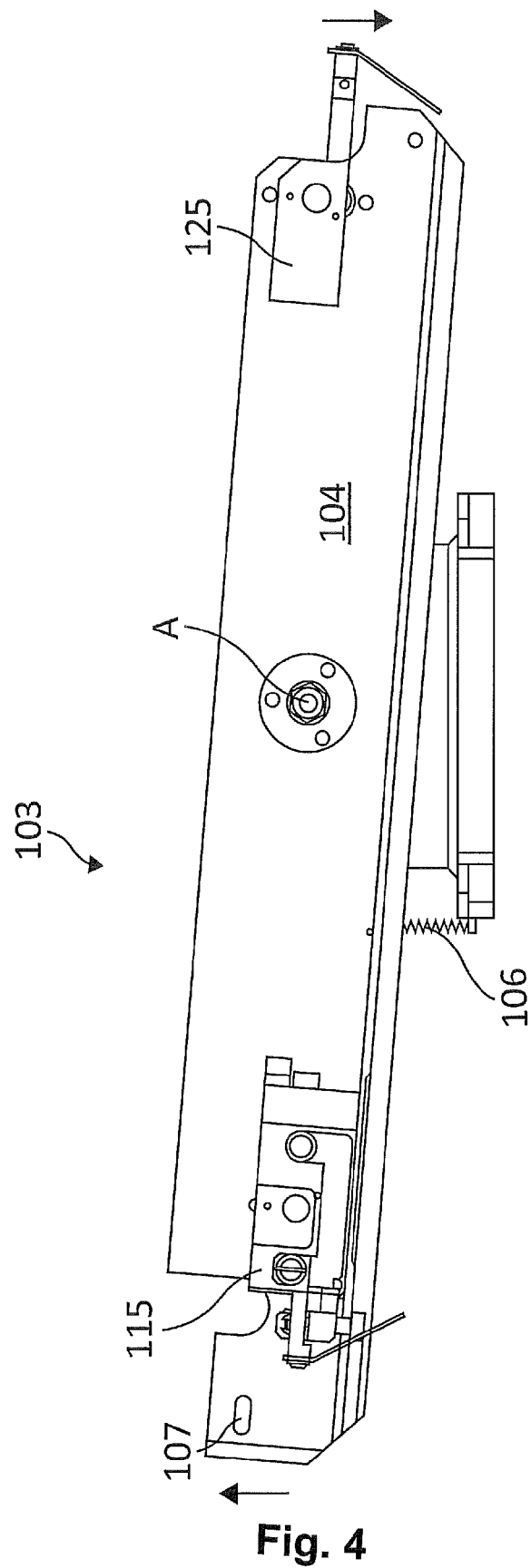
FIG. 4 shows the stop arrangement of FIG. 1 in a position tilted to the right.

Comparison bridge 100 furthermore comprises a stop arrangement 103 for making available various image configurations. In FIG. 1, the stop arrangement is partly concealed by partial images beams 112 and 122, which are shown in the entire cross section and in this case extend horizontally. In FIGS. 2 to 4, the partial image beams are omitted and stop arrangement 103 is thus completely visible.

Stop arrangement 103 comprises a first, movably arranged stop element 115 in order to make available the various image configurations. Stop element 115 comprises an alignably arranged stop means 910 that, by movement of stop element 115, can be arranged in an intermediate image plane 114 of left partial image beam 112. Stop arrangement 103 further comprises a second, movably arranged stop element 125 having a stop means 950 that, by movement of stop element 125, can be arranged in an intermediate image plane 124 of right partial image beam 122. Stop elements 115 and 125 are connected or coupled by means of a connecting means embodied here as plate 104, and are mounted rotatably thereon.

Stop arrangement 103 is mounted on a bearing 105 rotatably about an axis A perpendicular to the plane of the drawing. Stop element 115 is in turn mounted rotatably about an axis B perpendicular to the plane of the drawing, and stop element 125 is mounted on plate 104 and rotatably about an axis C perpendicular to the plane of the drawing.

FIG. 2 illustrates stop arrangement 103 in the first position of the stop elements, in which resultant image beam 102 is made up of juxtaposed areal proportions of partial image beams 112 and 122 (split image). For this purpose, one half of partial image beam 112 is blocked out by stop element 115, and one half of partial image beam 122 by stop element 125 (visible in FIG. 1). In the illustration of FIG. 2, analogously to FIG. 1, the upper halves of the respective partial image beam are allowed to pass and are assembled into the resultant image beam.

FIGS. 3 and 4 depict the manner in which the respective areal proportions of partial image beams 112 and 122 in resultant image beam 102 are modifiable by movement of connecting means 104. FIG. 3 illustrates stop arrangement 103 in a position rotated counter-clockwise about rotation axis A, in which position the areal proportion of left partial image beam 112 is made larger and the areal proportion of right partial image beam 122 is made smaller. This is achieved by the fact that a rotation of plate 104 moves stop element 115 downward out of left partial image beam 112, while conversely stop element 125 is moved upward into right partial image beam 122.

The clockwise-rotated position of stop arrangement 103 is illustrated in FIG. 4: stop element 115 has been moved upward into left partial image beam 112, and stop element 125 has been moved downward out of right partial image beam 122.

Also clearly visible in FIGS. 3 and 4 is a preloading means, embodied here as spring 106, that coacts with an eccentric arrangement in order to make available zero-clearance rotary mounting of stop arrangement 103 in bearing 105. An engagement opening of eccentric arrangement into stop arrangement 103 or its plate 104 is referenced by 107.

Figure 5:
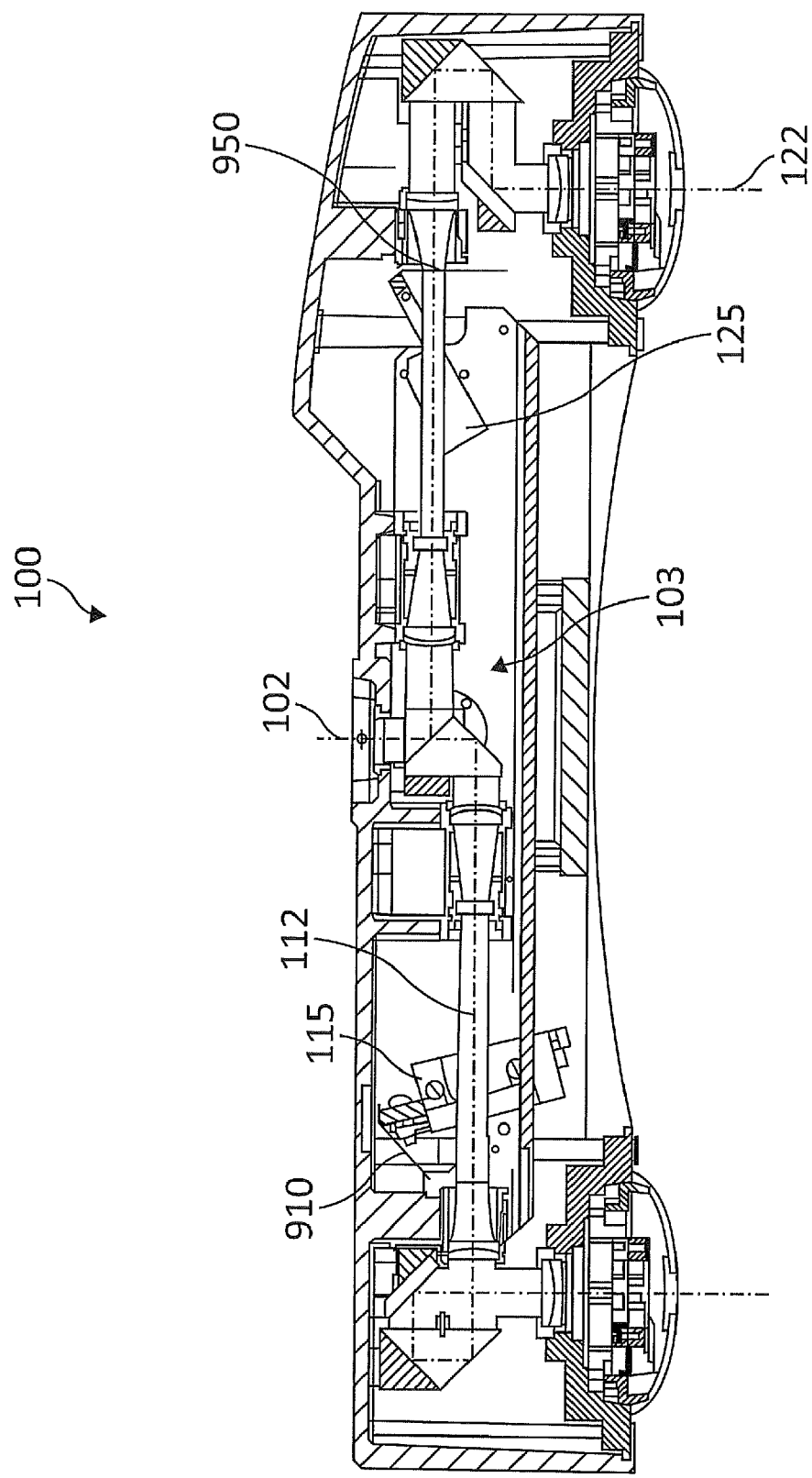
FIG. 5 shows the optical system in accordance with FIG. 1 in a position in which the right partial image is completely blocked out.
Figure 6:
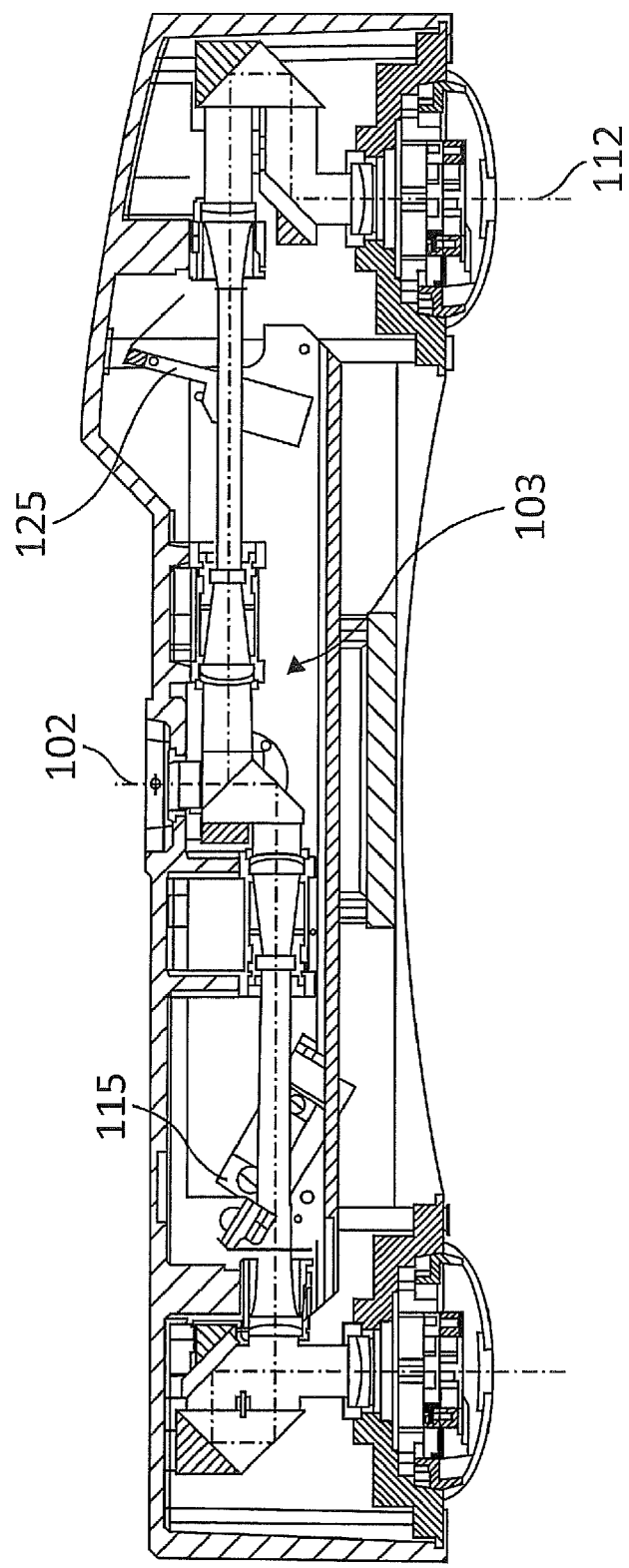
FIG. 6 shows the optical system in accordance with FIG. 1 in a position in which the left partial image is completely blocked out.
Figure 10:
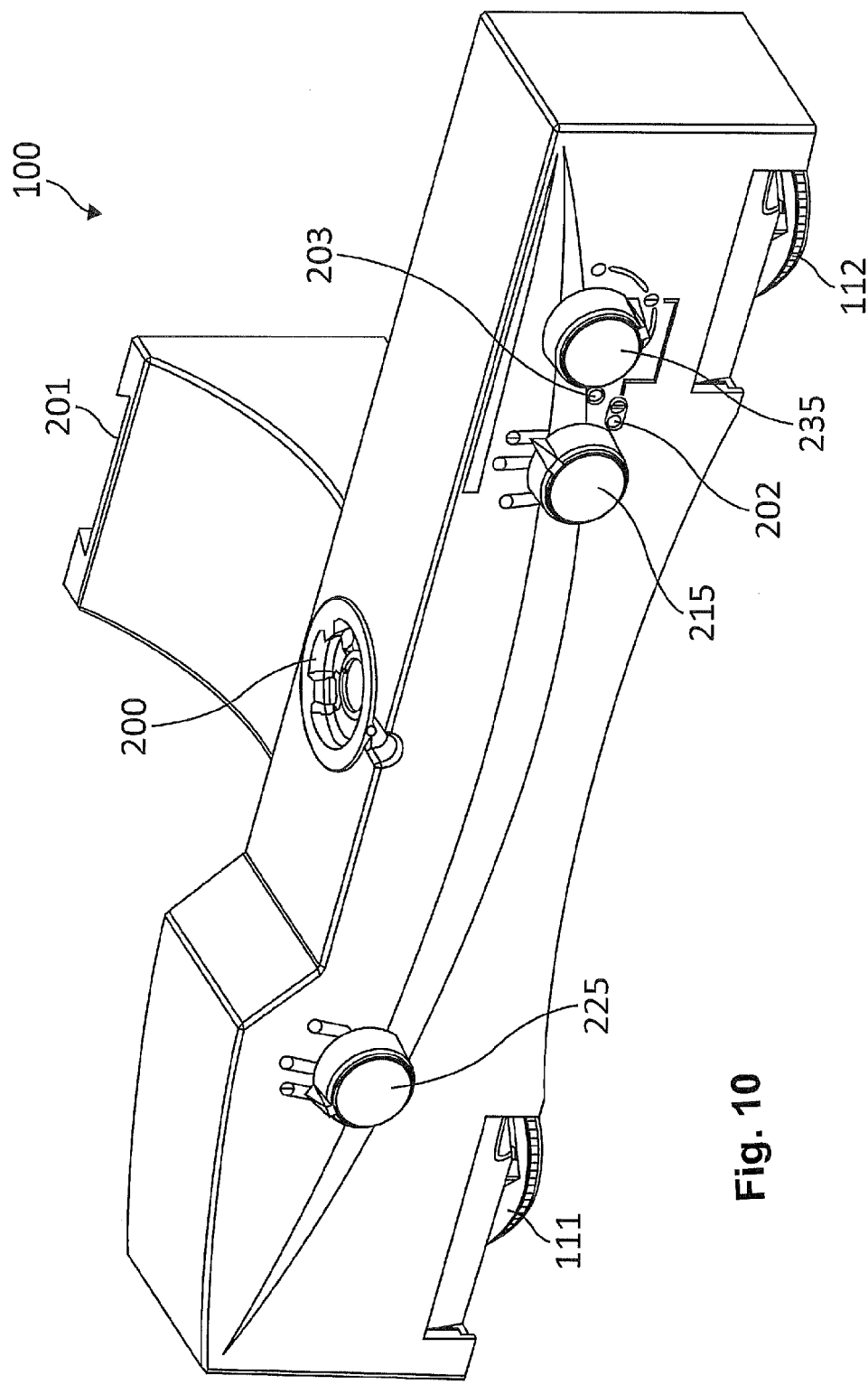
FIG. 10 is a perspective external view of the optical system of FIGS. 1 to 6.

FIG. 5 depicts optical system 100, stop arrangement 103 being located in a position ("complete left image") in which resultant image beam 102 is formed only by left partial image beam 112, while conversely right partial image beam 122 is blocked out by stop element 125. The position in which resultant image beam 102 is formed only by right partial image beam 122 is depicted in FIG. 6 ("complete right image"). It is evident that stop elements 115 and 125 can be rotated, independently of one another, about their respective rotation axes B and C, corresponding adjusting means being provided for the operator. As depicted in FIG. 10, in the preferred embodiment that is shown, the adjusting means are embodied as rotary knobs 215, 225. Be it noted that in accordance with the embodiment depicted, rotary knobs 215 and 225 move along with stop elements 115, 125 upon tilting of plate 104.

Figure 7:
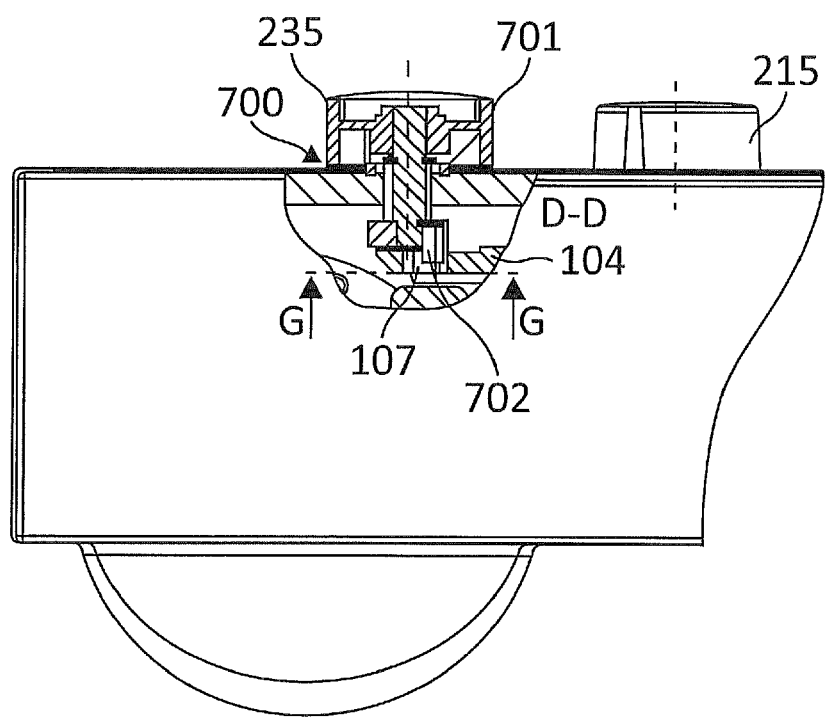
FIG. 7 shows an eccentric arrangement for moving the connecting means of the optical system of FIGS. 1 to 6.
Figure 8:
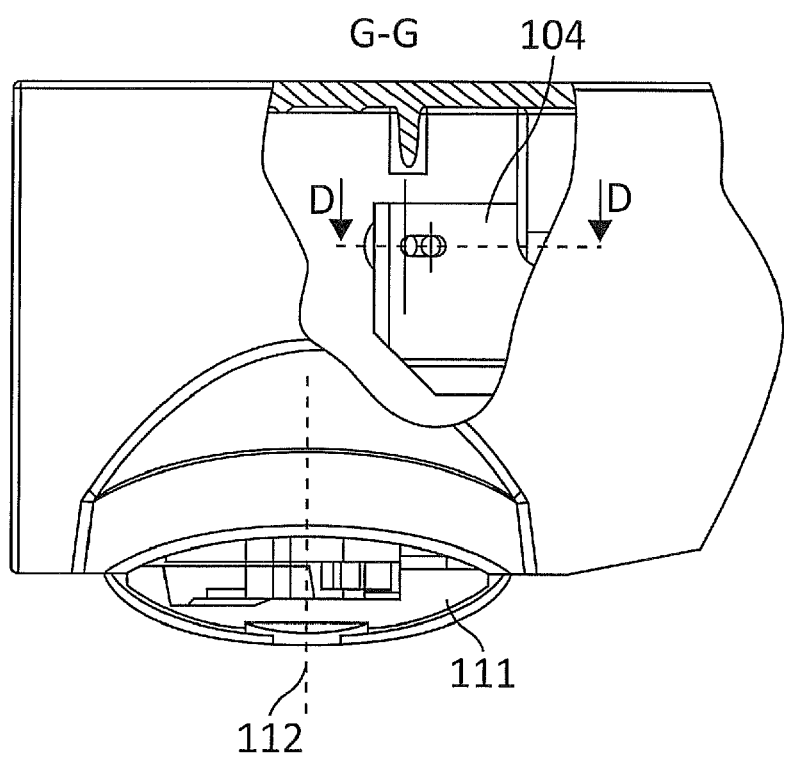
FIG. 8 shows the engagement of the eccentric arrangement into the connecting means, along section line G-G of FIG. 7.
Figure 9A:
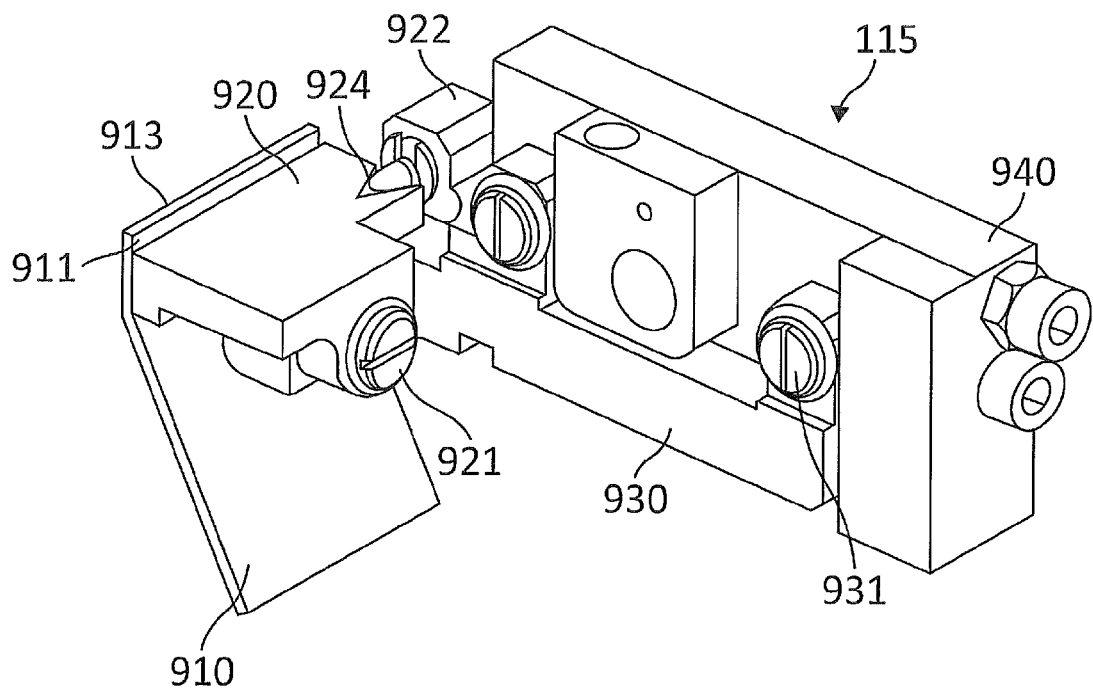
FIGS. 9a to 9d are various views of the alignable stop element of the stop arrangement of FIGS. 1 to 6.
Figure 9B:
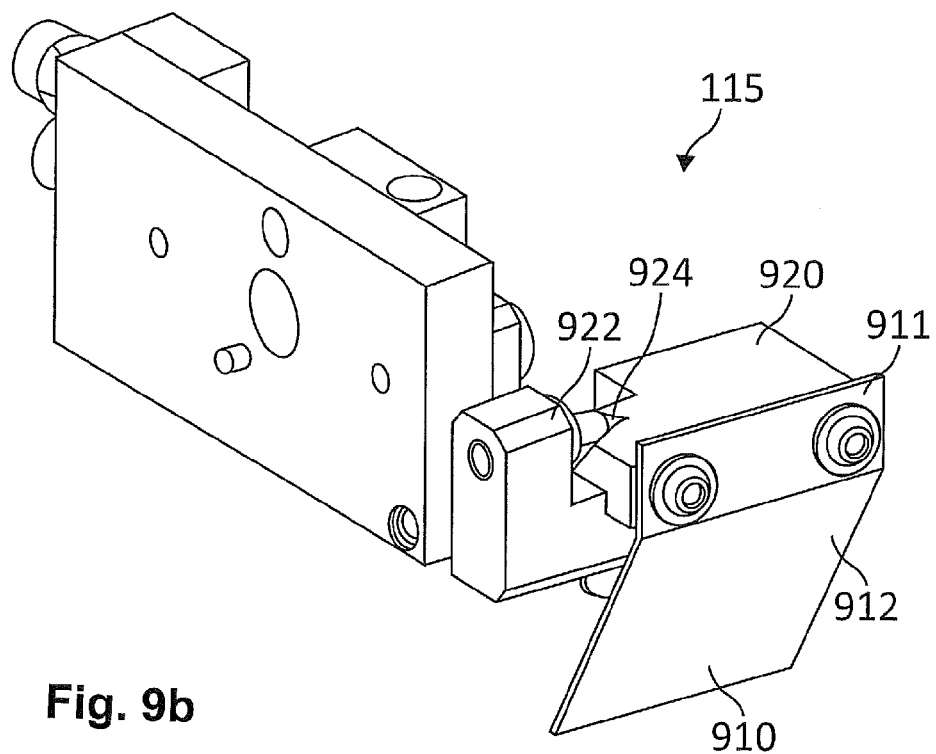
Figure 9D:
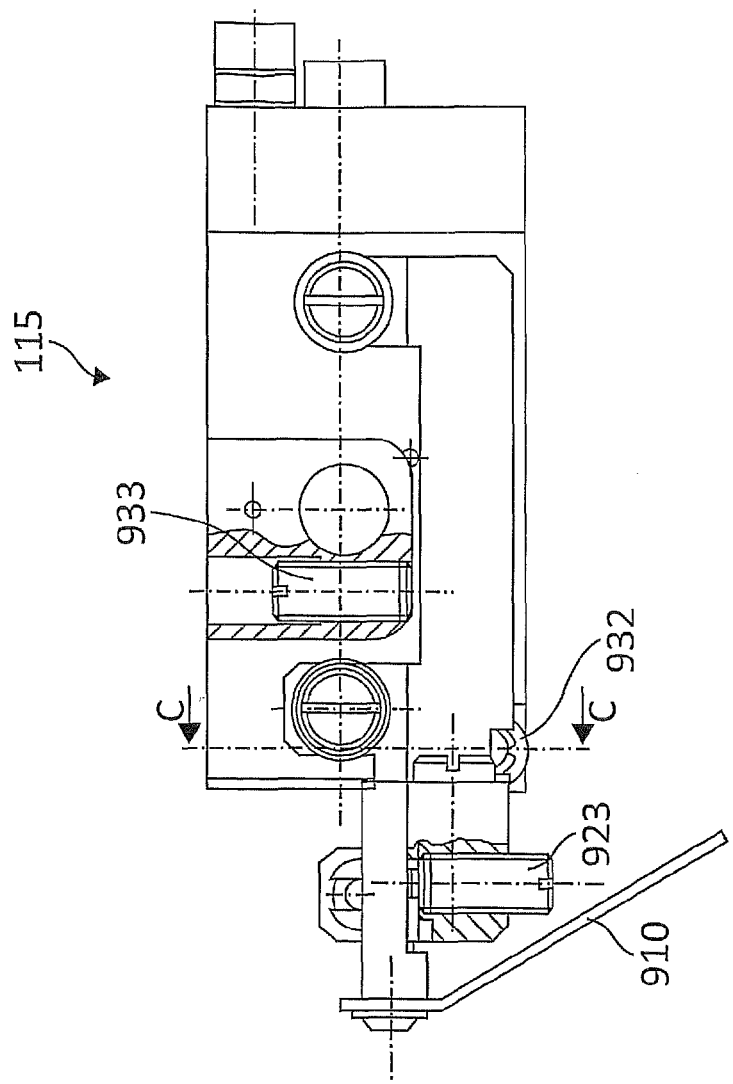
Figure 9C:
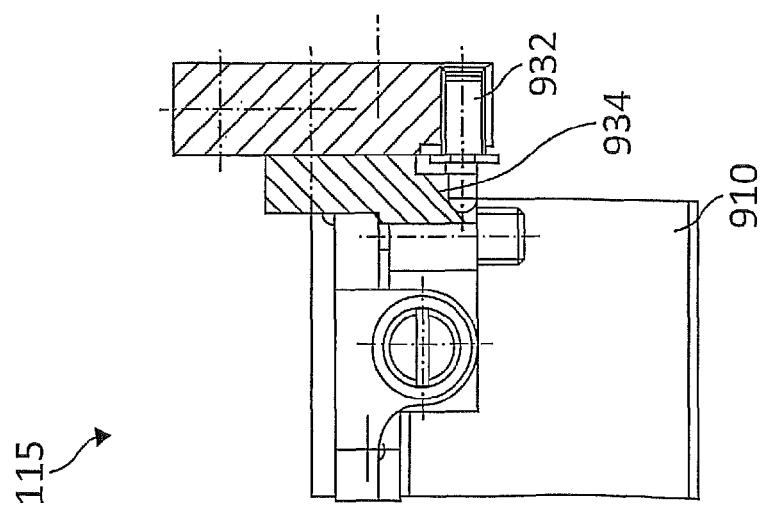

In FIGS. 7 and 8, the eccentric arrangement for moving connecting means 104 is depicted in various sectional views and referenced by 700 in its entirety. FIG. 8 is a sectional view along line G-G of FIG. 7. FIG. 7 in turn is a sectional view along line D-D of FIG. 8. Eccentric arrangement 700 is equipped with a rotary knob 235 so that it can easily be operated by the user. The eccentric arrangement comprises a rotatably mounted shaft 701 and a pin 702, arranged with an offset from the shaft, that engages into opening 107 in plate 104 that is provided as a connecting means. An actuation of rotary knob 235 by the user causes eccentric arrangement 700 to rotate, with the result that pin 702 moves upward or downward in FIG. 8, and plate 104 tilts accordingly.

FIGS. 9A to 9D depict various views of the alignable stop element 115. Stop element 115 comprises a stop means 910 that can be brought into intermediate image plane 114 in order to block out partial image beam 112 completely or partially. Stop means 910 comprises, for this purpose, a first stop region 911 that serves as a half-stop when stop arrangement 103 is in the first position. This is clearly apparent from FIG. 1, in which stop region 911, constituting a half-stop, blocks out half of left partial image beam 112. Stop means 910 furthermore comprises a second region 912 that serves as a solid stop in order to block out partial image beam 112 completely. This is clearly apparent from FIG. 6, in which stop region 912, constituting a solid stop, completely blocks out left partial image beam 112.

Stop means 910 is arranged, by means of connecting means not further designated, on a first stop carrier 920. First stop carrier 920 is mounted rotatably about an axis of a connecting means 921, with the result that a rotation or tilting of an edge 913 of stop region 911 in the beam path, and thus relative to the position of stop means 950 (see FIG. 1) is achievable. Provided for this purpose is a second aligning means 922 that can be utilized by the user of comparison bridge 100 in order to tilt edge 913 of stop means 910. Aligning means 922 is embodied here as a screw arrangement. Aligning means 922 comprises a screw, adjustable by the user, that interacts with a V-shaped groove 924 in order to tilt edge 913 of stop means 910. When the screw is screwed into aligning means 922, the tip of the screw travels farther into V-shaped groove 924 and pushes stop carrier 920 downward on that side. When the screw is unscrewed out of aligning means 922, the tip of the screw travels out of V-shaped groove 924 and enables stop carrier 920 to move upward on that side. A preloading means 923 is also provided in order to move stop carrier 920 upward and ensure zero-clearance rotary mounting about the axis of fastening means 921.

First stop carrier 920 is attached, by means of fastening means 921, to a second stop carrier 930 that is mounted on a third stop carrier 940 rotatably about an axis of a fastening means 931. As a result of the rotatable mounting of stop carrier 930 about the axis of fastening means 931, an adjustment of stop means 910, and thus a displacement of edge 913, upward and downward can be brought about. Provided for this is a first aligning means 932 (see FIG. 9d) that is embodied here likewise as a screw arrangement and coacts with an inclined plane 934. The manner of operation of first aligning means 932 corresponds to the manner of operation of second aligning means 922. The first aligning means coacts with a preloading means 933 in order to make available zero-clearance rotary mounting of stop carrier 930 about the axis of fastening means 931. Lastly, stop element 115 is fastened on plate 104 by means of stop carrier 940.

Stop element 125 can, like stop element 115, likewise be embodied alignably. It is also possible, however, as in the exemplifying embodiment shown, to embody stop element 125 without aligning means, since a relative movement of the stop regions with respect to one another can also be made available by aligning only stop means 910.

FIG. 10 depicts comparison bridge 100 externally in perspective. Comparison bridge 100 comprises a connector 200 for receiving further optical components such as, for example, an optical tube, as well as a mount 201, embodied here as a dovetail guide, for attachment to, for example, a stand. Also visible are the adjusting means, embodied as rotary knobs 215, 225, and 235, that enable easy manual operation of the comparison bridge by the user. An opening 202 is provided in order to make first aligning means 932 accessible from outside. Also provided is an opening 203 in order to make second aligning means 922 accessible from outside. In the preferred embodiment depicted, aligning means 922, 932 are adjustable, for example using a corresponding tool, through openings 202, 203. Because the openings are configured to be relatively small in order to prevent the entry of dirt, the aligning means are accessible only when stop unit 115 is in the horizontal (untilted) half-image setting.

Figure 11:
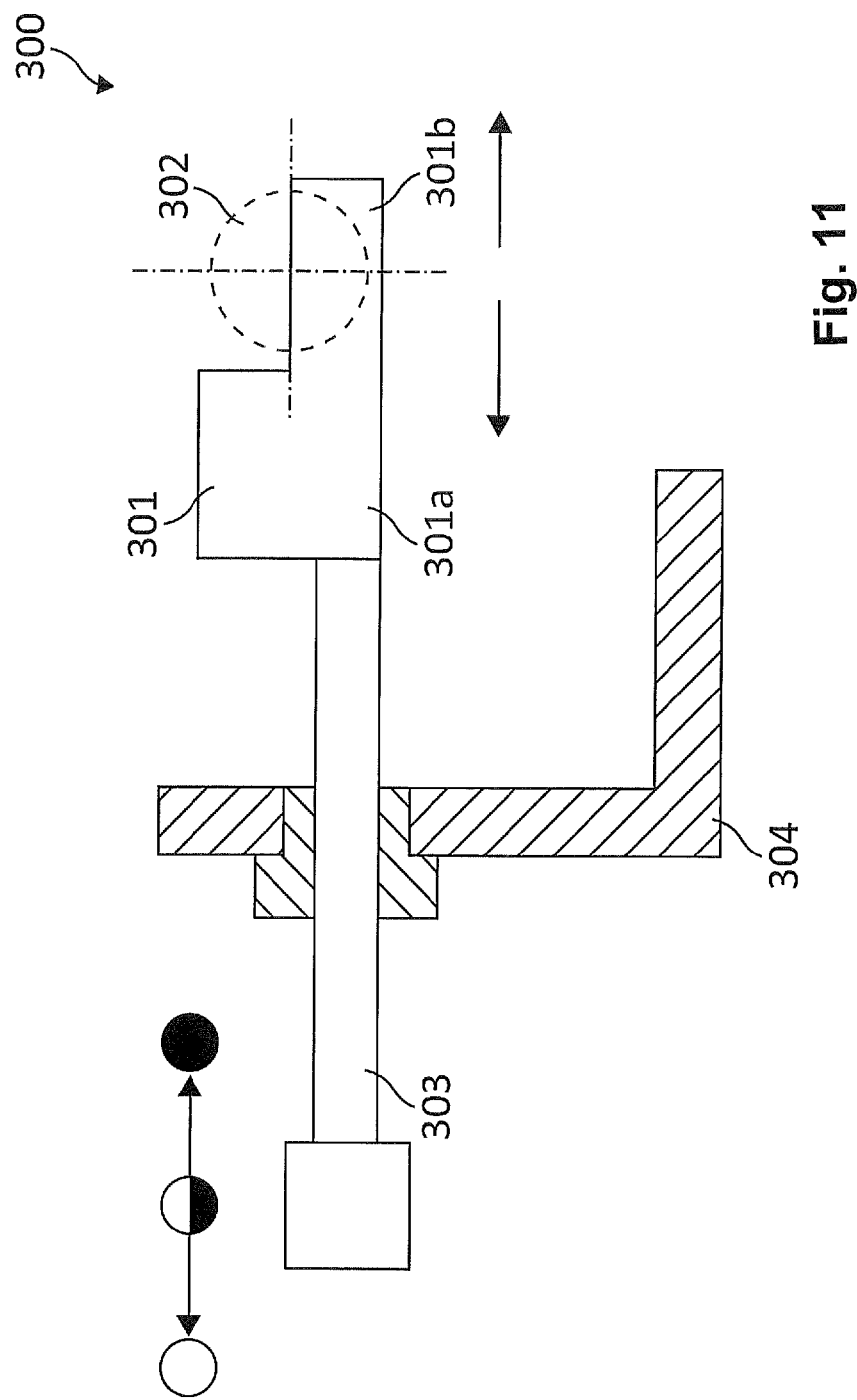
FIG. 11 is a schematic sectioned view of a second embodiment of a stop element usable for the invention.

In FIG. 11 a second embodiment of a stop element is schematically depicted and referenced by 300 in its entirety. The stop element comprises a stop means 301 that can be brought into a beam path 302. Stop element 300 comprises for this purpose an adjusting means, embodied here as push bar 303, by means of which stop means 301 can be moved perpendicular to the beam path. The stop means comprises two stop regions 301a, 301b in order to block out beam path 302 completely or partly, respectively. In addition, stop means 301 can be removed from the beam path by a leftward movement. Lastly, stop element 300 comprises a fastening means 304 for fastening to the connecting means.

Figure 12:
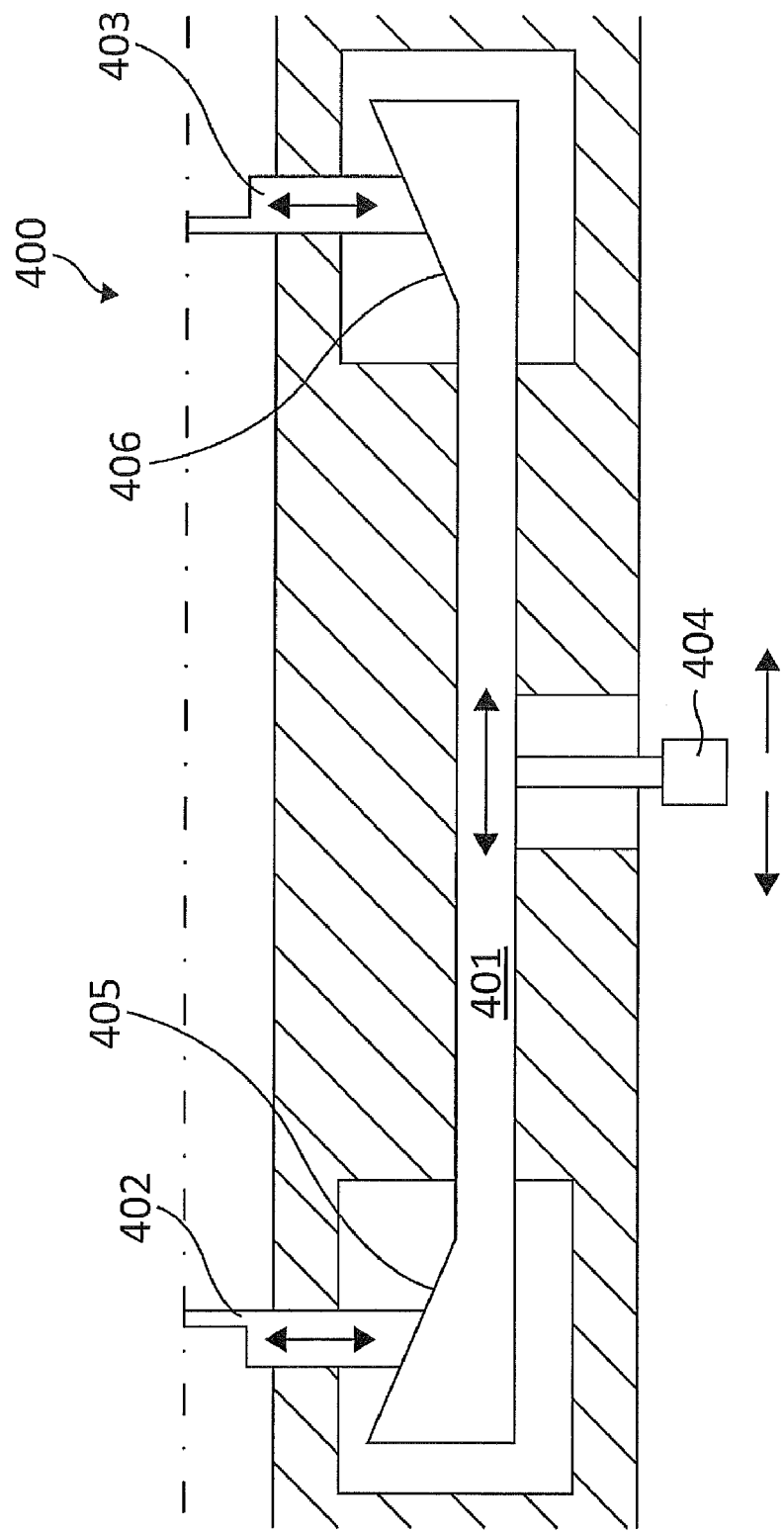
FIG. 12 is a schematic sectioned view of a second embodiment of a stop arrangement usable for the invention.

In FIG. 12 a second embodiment of a stop arrangement usable for the invention is schematically depicted and referenced by 400 in its entirety. Stop arrangement 400 comprises a connecting means 401 for connecting two stop elements 402 and 403. Stop arrangement 400 further comprises an adjusting means, embodied here as handle 404, to move connecting means 401.

Connecting means 401 is equipped at its ends with inclined planes 405 and 406 that, by coaction with stop elements 402 and 403, enable a displacement of said stop elements. In the depiction shown, for example, stop element 403 is displaced upward, and stop element 402 downward, when the user moves handle 404 to the left.

Figure 13:
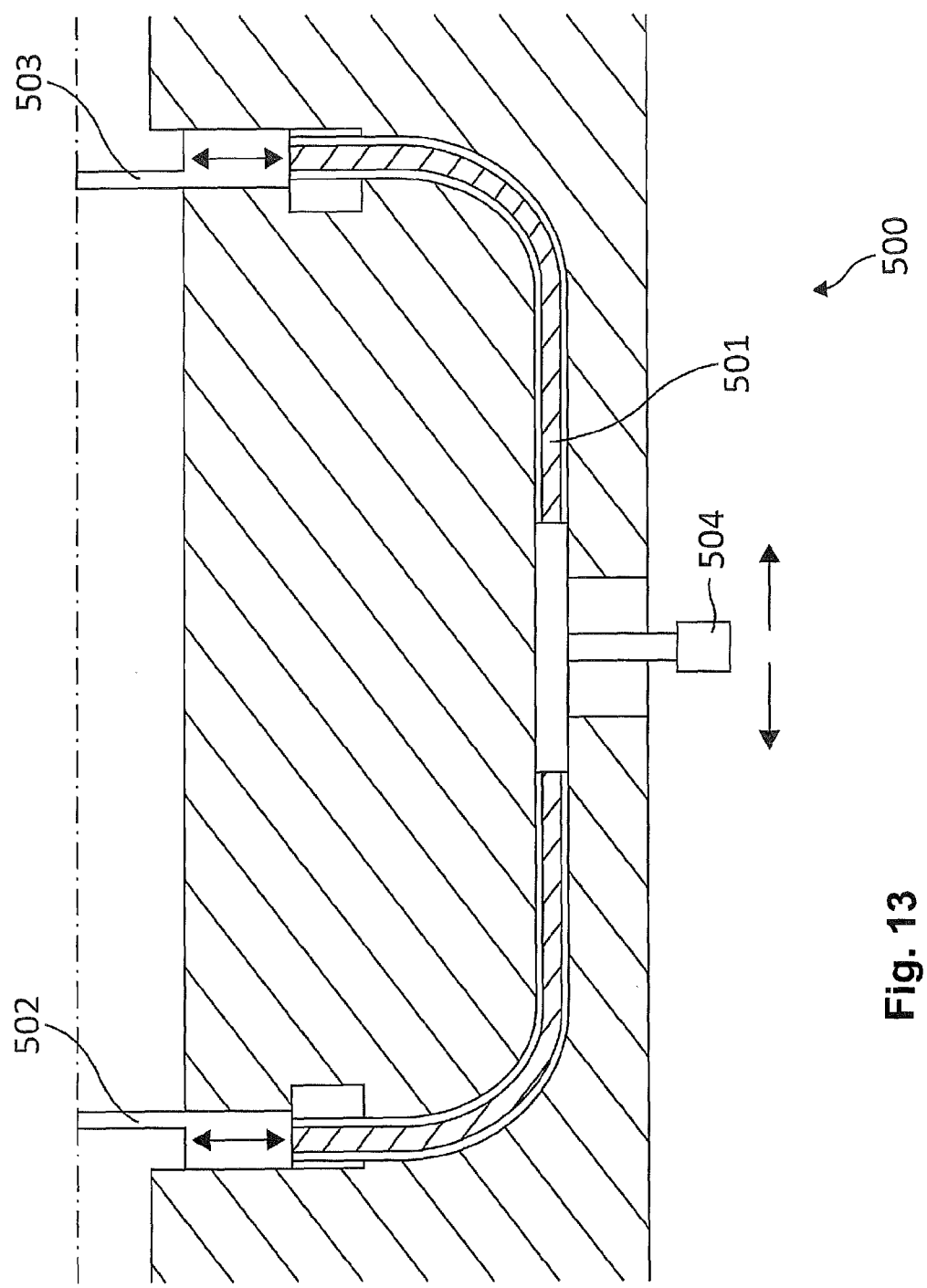
FIG. 13 is a schematic sectioned view of a third embodiment of a stop arrangement usable for the invention.

In FIG. 13 a third embodiment of a stop arrangement suitable for the invention is schematically depicted and referenced by 500 in its entirety. Stop arrangement 500 comprises a connecting means, embodied here as flexible shaft 501, for connecting stop elements 502 and 503. Flexible shaft 501 is movable by means of an adjusting means, embodied here as handle 504, in order to modify the areal proportions of the respective partial image beams impinged upon by stop elements 502 and 503. In the depiction shown, for example, stop element 503 is displaced upward, and stop element 502 downward, when the user moves handle 504 to the left.

Figure 14:
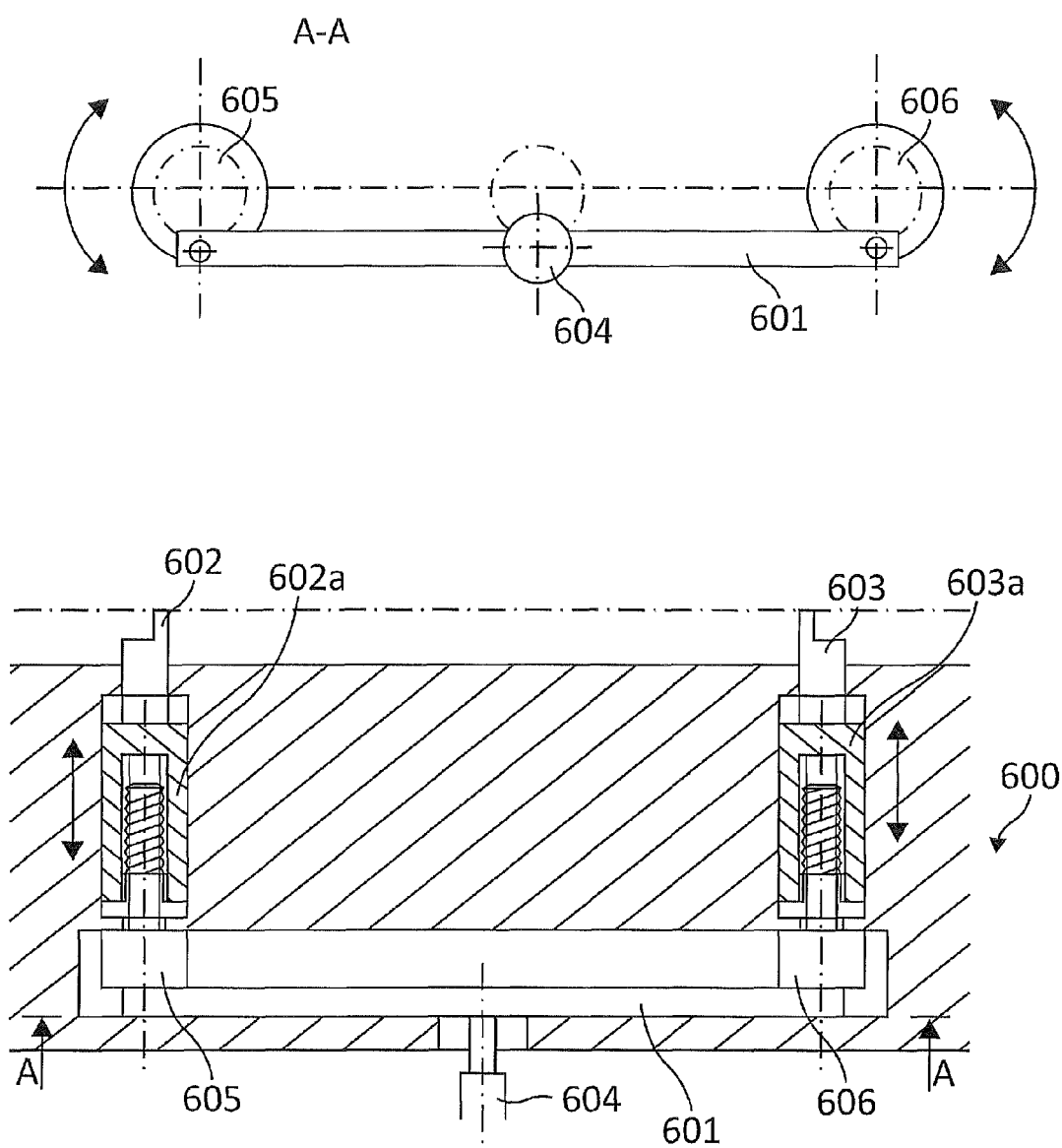
FIG. 14 shows two schematic sectioned views of a fourth embodiment of a stop arrangement usable for the invention.

Lastly, in FIG. 14 a fourth embodiment of a stop arrangement suitable for the invention is schematically depicted and labeled 600 in its entirety. Stop arrangement 600 comprises a connecting means, embodied here as plate 601, for connecting stop elements 602 and 603. Stop elements 602 and 603 are each arranged on a respective helical bearing 602a, 603a that converts a helical movement into a linear movement. Helical bearings 602a and 603a are each equipped, for this purpose, with a respective eccentric arrangement 605 and 606, each of which is in turn connected to plate 601. Also provided on plate 601 is an adjusting means, embodied as a handle 604 operable by the user, by means of which the user can perform a rotary movement as indicated in the cross-sectional view A-A. A rotary movement of handle 604 is transferred via plate 601 to eccentric arrangements 605 and 606, which correspondingly impinge respectively upon rotary bearings 602a and 603a. Rotary bearings 602a and 603a are embodied so that a rotation of handle 604 brings about differently directed movements of stop elements 602 and 603. The areal proportions of the partial image beams in the resulting image beam can, in this fashion, be modified by way of a movement of handle 604 by the user.

Be it noted that the illustrations according to FIGS. 12 to 14 are merely schematic depictions to explain the functional principle, and that further elements not depicted, for example preloading means, bearing means, etc., can be used in the physical configuration.

The invention makes available an optical system for merging a first and a second partial image beam into a resultant image beam, which system can be used with advantage in all kinds of comparative examinations. It permits simple and convenient operation which is possible, in particular, manually and with one hand. The proposed preferred embodiment is operable in particularly ergonomic and functional fashion, since one-handed operation allows simultaneous operation of other microscope or macroscope functions using the free hand. The invention can be implemented in unmotorized and comparatively economical fashion, and can nevertheless make available all the image configurations desired by the user.

| List of component parts | |
|---|---|
| A, B, C | Rotation axis |
| 10, 20 | Specimen |
| 100 | Comparison bridge |
| 101 | Splitter prism |
| 102 | Resultant image beam |
| 103 | Stop arrangement |
| 104 | Plate (connecting means) |
| 105 | Bearing |
| 106 | Spring |
| 107 | Engagement opening |
| 110, 120 | Arm |
| 111, 121 | Objective receptacle |
| 112, 122 | Partial image beam |
| 113, 123 | Deflection prism |
| 114, 124 | Intermediate image plane |
| 115, 125 | Stop element |
| 200 | Connector for receiving optical components |
| 201 | Mount |
| 202, 203 | Opening |
| 215, 225, 235 | Rotary knob |
| 300 | Stop element |
| 301 | Stop means |
| 301a, 301b | Stop region |
| 302 | Beam path |
| 303 | Push bar |
| 304 | Fastening means |
| 400 | Stop arrangement |
| 401 | Connecting means |
| 402, 403 | Stop element |
| 404 | Handle |
| 500 | Stop arrangement |
| 501 | Flexible shaft (connecting means) |
| 502, 503 | Stop elements |
| 504 | Handle |
| 600 | Stop arrangement |
| 601 | Plate (connecting means) |
| 602, 603 | Stop elements |
| 602a, 603a | Helical bearings |
| 604 | Handle |
| 605, 606 | Eccentric arrangement |
| 700 | Eccentric arrangement |
| 701 | Shaft |
| 702 | Pin |
| 911, 912 | Stop region |
| 910 | Stop means |
| 920, 930, 940 | Stop carrier |
| 921, 931 | Fastening means, axis |
| 922, 932 | Aligning means |
| 923, 933 | Preloading means |
| 924 | Groove |
| 934 | Inclined plane |
| 950 | Stop means |

What is claimed is:

1. An optical system for merging a first and a second partial image beam into a resultant image beam in an optical instrument, wherein the first and second partial image beam both emanate from a specimen, said optical system comprising a stop arrangement provided with:
   at least one first movable stop element for the first partial image beam;
   at least one second movable stop element for the second partial image beam; wherein
   said first and second stop elements each comprise at least one stop region adapted to be brought into a working position with the first or second partial image beam by movement of the respective first or second stop element in order to modify the areal proportion of the respective first or second partial image beam in the resultant image beam; and
   a movably arranged connecting means for connecting the first and second stop elements such that the first and second stop elements can be moved jointly by moving the connecting means and can be moved in addition independently with respect to each other.

2. The optical system according to claim 1, wherein the connecting means connects the two stop elements rigidly.

3. The optical system according to claim 1, wherein the stop arrangement can be brought into a first configuration wherein the first and the second stop element assume a respective first position in that a movement of the connecting means increases the areal proportion of the first partial image beam in the resultant image beam and decreases the areal proportion of the second partial image beam in the resultant image beam.

4. The optical system according to claim 3, further comprising a first manually operable adjusting means for moving the connecting means.

5. The optical system according to claim 3, wherein the movement of the connecting means is a rotary movement about a first axis of rotation.

6. The optical system according to claim 5, wherein the first axis of rotation extends perpendicular to a longitudinal axis of the connecting means between the stop elements.

7. The optical system according to claim 5, wherein an eccentric arrangement is provided in order to rotate the connecting means about the first axis of rotation.

8. The optical system according to claim 3, wherein the movement of the connecting means is a linear movement.

9. The optical system according to claim 3, wherein the movement of the connecting means is one of a circular movement and an elliptical movement.

10. The optical system according to claim 3, wherein the stop arrangement can be brought into first, second, third, and fourth configurations by moving the first and second stop elements into the respective positions.

11. The optical system according to claim 1, wherein the stop arrangement comprises at least one aligning means adapted to align the stop elements with respect to one another.

12. The optical system according to claim 11, wherein the at least one aligning means is accessible from outside for a user.

13. The optical system according to claim 11, wherein the stop arrangement comprises at least one first aligning means for displacing edges of the stop regions of different stop elements relative to one another.

14. The optical system according to claim 13, wherein the at least one first and the at least one second aligning means are provided on the same stop element.

15. The optical system according to claim 11, wherein the stop arrangement comprises at least one second aligning means for tilting edges of the stop regions of different stop elements relative to one another.

16. The optical system according to claim 1, wherein the stop arrangement comprises at least one aligning means for aligning the relative orientation of stop regions of different stop elements with respect to one another.

17. The optical system according to claim 1, wherein the stop arrangement can be brought into a second configuration wherein the first and the second stop element assume a respective second position in which the resultant image beam is formed by mixing of the two partial image beams.

18. The optical system according to claim 1, wherein the stop arrangement can be brought into a third and a fourth configuration wherein the first and the second stop element assume a respective third and fourth position in which the resultant image beam is formed only by the first and only by the second partial image beam, respectively.

19. The optical system according to claim 18, wherein a second and a third manually operable adjusting means are provided for moving each of the stop elements.

20. The optical system according to claim 1, wherein at least one of the stop elements is mounted rotatably on the connecting means.

21. The optical system according to claim 1, wherein at least one of the stop elements is mounted displaceably on the connecting means.

22. The optical system according to claim 1, wherein the one or more stop regions form at least one stop element of a continuous, cutout-free surface.

23. A comparison microscope or comparison macroscope encompassing an optical system according to claim 1.

* * * * *